United States Patent [19]

Schwarz

[11] Patent Number: 5,051,681
[45] Date of Patent: Sep. 24, 1991

[54] ELECTRONIC CIRCUIT FOR A SINGLE PHASE INDUCTION MOTOR STARTING

[75] Inventor: Marcos G. Schwarz, Joinville, Brazil

[73] Assignee: Empresa Brasileira de Compressores S/A Embarco, Joinville SC, Brazil

[21] Appl. No.: 615,579

[22] Filed: Nov. 19, 1990

[30] Foreign Application Priority Data

Nov. 28, 1989 [BR] Brazil .................. PI8906225

[51] Int. Cl.⁵ .............................................. H02P 1/44
[52] U.S. Cl. .................................. 318/786; 318/781; 318/817
[58] Field of Search ............... 318/778, 781, 784–787, 318/816, 817

[56] References Cited

U.S. PATENT DOCUMENTS

| | | | |
|---|---|---|---|
| 3,538,411 | 11/1970 | Knauer et al. | 318/787 |
| 3,970,908 | 7/1976 | Hansen et al. | 318/786 |
| 4,622,506 | 11/1986 | Shemanske et al. | 318/786 |
| 4,651,077 | 3/1987 | Woyski | 318/786 |
| 4,670,697 | 6/1987 | Wrege et al. | 318/786 |
| 4,782,278 | 11/1988 | Bossi et al. | 318/786 |

Primary Examiner—William M. Shoop, Jr.
Assistant Examiner—John W. Cabeca
Attorney, Agent, or Firm—Darby & Darby

[57] ABSTRACT

An electronic circuit for starting a single phase induction motor operating from a source of alternating current, the motor having a cage type rotor, a coiled stator having at least a main winding and a starting winding, and a permanent capacitor connected in series with the starting winding. The permanent capacitor and the starting winding are connected in parallel to the alternating current source and the main winding in series. A TRIAC has a first terminal connected to one side of the alternating current source and a second terminal connected to the starting winding and to the permanent capacitor. A TRIAC trigger circuit is connected between the TRIAC second terminal and its GATE terminal and a bilateral swtich is connected to the TRIAC GATE terminal. A timer circuit is connected to the bilateral switch and to the alternating current source, the timer circuit defining the time elapsed from the motor powering up till the interruption of the TRIAC conduction by turning on the bilateral switch, the TRIAC trigger circuit repeatedly triggering the TRIAC to a turn on condition at the beginning of each current half-cycle while the bilateral switch remains cut off by the timer circuit.

12 Claims, 1 Drawing Sheet

ELECTRONIC CIRCUIT FOR A SINGLE PHASE INDUCTION MOTOR STARTING

FIELD OF THE INVENTION

This invention refers to a single phase induction motor and, more specifically, a starting electronic device for a single phase induction motor.

BACKGROUND OF THE INVENTION

Single phase induction motors have been widely used due to their construction simplicity, rigidity and high performance. They are particularly useful for low power range applications such as household appliances, refrigerator hermetic compressors, washing machine motors, fans. They are also used in some industrial applications as well.

Single phase induction motors generally have a cage type rotor and a coiled stator, basically having two windings, one being for the main coil and the other for the starting coil. When an alternating voltage source is applied only to the main coil of a single phase induction motor, a magnetic field fixed in space and alternating in magnitude is created which does not develop any torque to start the rotor movement. Accordingly, it is necessary to create a turning magnetic field to take the rotor from the static condition so that the starting is initiated.

Such turning magnetic field can be achieved by feeding the starting coil with a current time-displaced to the current flowing in the main coil, preferably at an angle as near as possible to 90°. The current phase angle in the starting coil in relation to the current in the main coil can be achieved by construction differences such as by designing the starting coil with a power factor higher than that of the main coil. It also can be achieved by installing an external impedance connected in series to the starting coil, the impedance usually being a resistor or a capacitor. It is necessary to install a device in series with the starting coil circuit which temporarily connects this circuit to the power source until the rotor has reached a speed near to the synchronous speed, thereby giving rise to the starting.

In motors in which a much higher efficiency is required, the starting coil is not fully disconnected from the voltage source after the starting, with a capacitor being kept in series with this winding. The running capacitor, or permanent capacitor, allows a current flow much lower than the current during the starting, but keeps a double phase feed condition for the motor, thereby increasing its maximum torque and increasing its efficiency.

For a motor having such configuration, employing a permanent impedance, there is known a type of starting device as described in the Brazilian patent document PI 201.210 consisting of a resistor having a positive temperature coefficient (PTC). This PTC resistor device, which is connected in series to the starting coil, has a low resistance at room temperature, thereby allowing a high current to flow during the starting. After a predetermined time, due to a self heating effect, it has a very high resistance, practically acting as an open circuit. During normal motor running, the voltage drops across the PTC is relatively high, and the resistor is kept hot, thereby dissipating a amount of power varying from 1.5 to 5 W or higher, depending upon the form of the resistor and motor and the room temperature. Such power expended by the PTC during the entire motor running period decreases the motor efficiency, thus being undesirable.

Another known starting device is a current relay which keeps the starting coil circuit on while the current in the main coil is high. Although it is a very simple device and does not consume any power during the normal motor running period, it is not advantageous because it cannot be used in configurations having a permanent capacitor. Such a fact is due to the delays inherent to relays which cause the contacts thereof to close right after the motor has been powered. At this time, the permanent capacitor will already have stored a high amount of energy and such energy will be dissipated when contacting the relay at the time it is closed thereby quickly causing its destruction.

Another known starting device is described in U.S. Pat. No. 4,605,888 consisting of an electronic circuit which uses a TRIAC. Although consuming a small quantity of power during the normal motor running, it cannot readily be used jointly with a permanent capacitor.

OBJECTS OF THE INVENTION

It is a general object of the present invention to provide an electronic circuit to start a single phase induction motor.

It is a further object of the invention to provide an electronic circuit to start a single phase induction motor which can be used in conjunction with a permanent capacitor.

It is a further another object of the invention to provide an electronic circuit to start a single phase induction motor which, in rated running condition, has no significant power consumption.

It is further another object of the invention to provide an electronic circuit to start a single phase induction motor which can be used in conjunction with a permanent capacitor and with a starting capacitor or any other series impedance with the starting winding.

It is further another object of the invention to provide an electronic circuit to start a single phase induction motor which is able to overcome the above cited disadvantages of the prior art by using a simple and very low cost circuit.

SUMMARY OF THE INVENTION

The above cited objects are achieved from an electronic circuit for starting a single phase induction motor having a cage type rotor, a coiled stator having at least a main winding and a starting winding, and a permanent capacitor connected in series with the starting winding. The motor operates from an alternating current source having first and second terminals. The permanent capacitor and the starting winding are connected in parallel to the voltage source terminals and the main winding is connected in series with said terminals.

According to the present invention, the electronic circuit comprises a TRIAC having a first terminal connected to the first terminal of the alternating voltage source, a second terminal connected to the starting winding and to the permanent capacitor and a gate terminal. The TRIAC trigger circuit is connected to the second terminal and to the GATE terminal of the TRIAC. There is also a bilateral switch having control terminals which is connected to the gate terminal and to the first terminal of the TRIAC.

A timer circuit is connected to the control terminals of a bilateral switch and to the first and second terminals of the alternating current source. The timer circuit defines the time elapsed from the motor powering up until the interruption of the TRIAC conduction by turning on the bilateral switch. The TRIAC trigger circuit repeatedly triggers the TRIAC to a turn on condition at the beginning of each current half-cycle while the bilateral switch remains cut off by the timer circuit.

Contrary to the known starting devices, the described circuit can temporarily connect the starting coil to the alternating voltage source until the motor acceleration has occurred and without consumption of power in the permanent running condition. Another advantage of the proposed circuit is to allow the operation in conjunction with the permanent capacitor or in conjunction with a starting capacitor and the permanent capacitor.

The circuit thus described is very simple and the number of components thereof is reduced.

BRIEF DESCRIPTION OF THE DRAWINGS

The invention will hereinafter be described with reference with the attached drawings, wherein.

DESCRIPTION OF A PREFERRED EMBODIMENT

Figure 1:
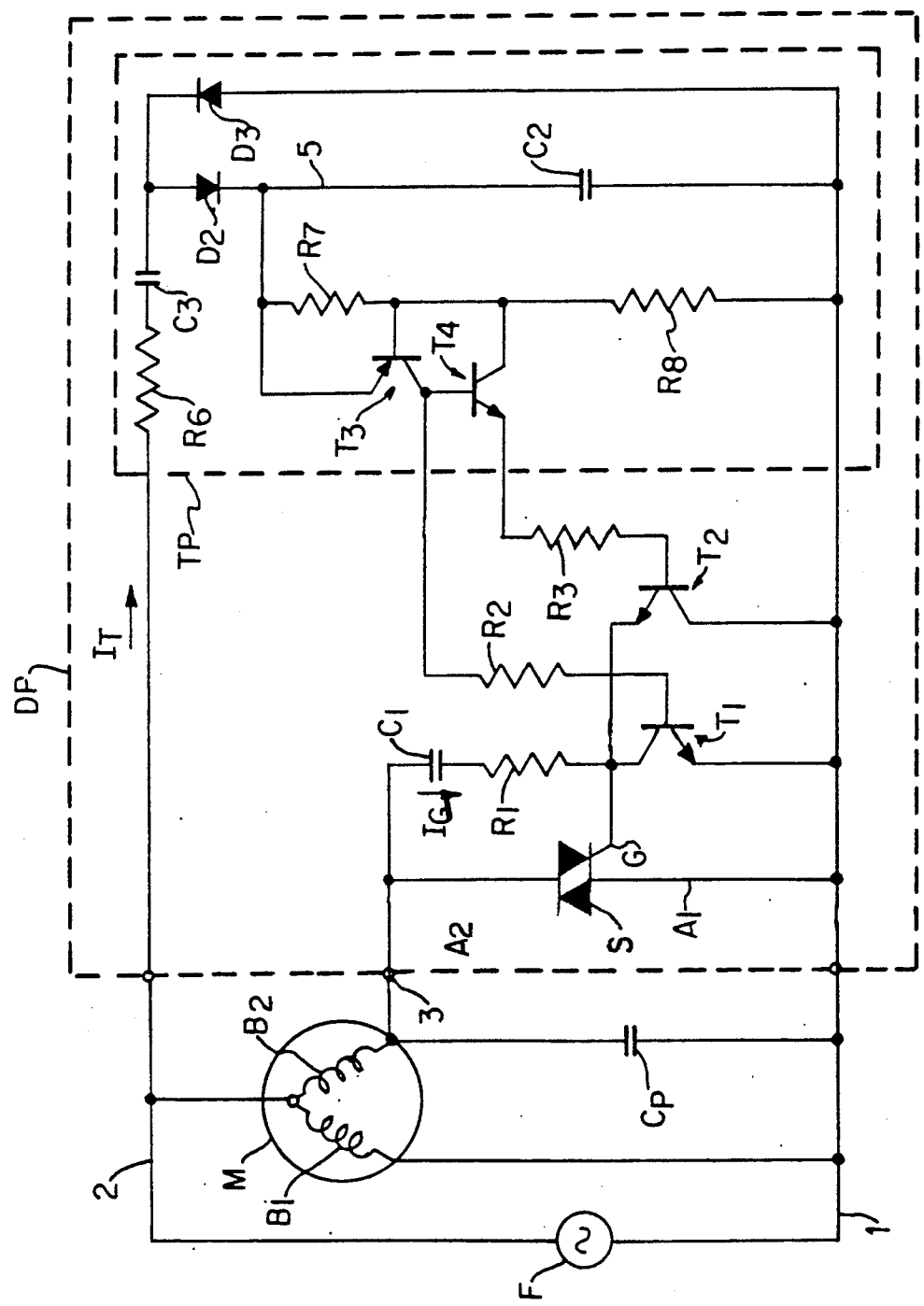
FIG. 1 shows the electronic circuit of the present invention.

Referring now to FIG. 1, the alternating voltage source F supplies voltage to the single phase induction motor M having a main coil B1 and a starting coil B2. The voltage supplied from terminals 1 and 2 of the source F is directly applied to the main coil B1 and is also applied to a starting circuit DP including the starting coil B2. The starting coil B2 is connected also to the voltage source F by a permanent capacitor Cp which is in parallel with the starting circuit DP as well.

Immediately after the motor M is powered by the source F, the voltage between terminals $A_1$ and $A_2$ of a TRIAC S begins to increase. Such variation in the voltage causes the current $I_g$ to flow through a TRIAC trigger circuit formed by a first capacitor $C_1$ and a first resistor $R_1$. In this condition a bilateral switch defined by a pair of first and second transistors $T_1$ and $T_2$, in cut off. This produces a voltage at the GATE terminal G of the TRIAC S to cause the TRIAC to conduct for a half cycle, after which the current in TRIAC is extinguished and the opposed half-cycle begins.

Immediately after the opposite half-cycle begins, the voltage between terminals $A_1$ and $A_2$ of the TRIAC S starts to increase again, but now in the opposite direction. The voltage variation between terminal $A_1$ and $A_2$ in TRIAC S in the opposite direction causes the current $I_G$ to flow through the circuit formed by the first capacitor $C_1$ and first resistor $R_1$ in the opposite direction as well. If the first and second transistors $T_1$ and $T_2$ are still cut off, the current IG flows to the GATE terminal G of the TRIAC S, thereby causing the TRIAC to turn on again.

Such TRIAC S conduction condition in the opposed direction will occur at most during a half-cycle. So, TRIAC S is newly triggered every time at the beginning of each half-cycle, and this repeatedly occurs whenever first and second transistors $T_1$ and $T_2$ remain cut off.

The TRIAC S trigger circuit, formed by first capacitor $C_1$ and first resistor $R_1$ allows a current IG to flow to the TRIAC GATE terminal which reaches the maximum value thereof exactly at the beginning of each half-cycle, thus triggering the TRIAC S when the voltage between the terminals $A_1$ and $A_2$ thereof is minimum. Thus, the energy stored in the permanent capacitor Cp when the TRIAC S turns on will be very low, thereby causing the intensity of the discharge current pulse of the permanent capacitor $C_p$ through TRIAC S to be low as well, avoiding any damage to the TRIAC.

The first capacitor $C_1$ value is selected so as that the time variation rate of the voltage between terminals $A_1$ and $A_2$ causes a passage of a current IG sufficient to trigger the TRIAC S. The value of first resistor $R_1$ is selected to limit the pulse intensity of the first capacitor $C_1$ discharge current through the GATE terminal G of the TRIAC S to levels not impairing the durability thereof.

The total TRIAC S conduction period during the starting is defined by a timer which, after a predetermined time has elapsed suddenly alters the voltage applied to third and fourth resistors $R_3$ and $R_2$ from zero to a value sufficient to cause first and second transistors $T_1$ and $T_2$ to conduct to saturation, which will bypass the current IG from the TRIAC GATE thereby stopping TRIAC S from conducting.

During the normal motor running, first and second transistors $T_1$ and $T_2$ are saturated so that in the positive half-cycles of current IG, first transistor $T_1$ conducts thereby keeping TRIAC S from firing and in the negative half-cycles of the current IG, second transistor $T_2$ conducts thereby also keeping TRIAC S from firing.

The timer is formed by a voltage source and a trigger and works as hereinafter described. Immediately after turning on the circuit, a second capacitor $C_2$ is discharged. During the positive half-cycles, a second diode $D_2$ conducts, thus allowing a current $I_T$ from the source F to flow towards second capacitor $C_2$, thereby increasing the voltage across the capacitor. In the negative half-cycles, the current $I_T$ is shifted by a third diode $D_3$ connector to the source F, thereby charging a third capacitor $C_3$.

In this way, in the following positive half-cycle, a current $I_T$ will flow again through the third capacitor $C_3$ and second diode $D_2$, thereby increasing once more the voltage on second capacitor $C_2$. Thus, the voltage on the second capacitor $C_2$ gradually increases by the successive charge which is transferred from the third capacitor $C_3$ to the second capacitor $C_2$ in the positive half-cycles.

In this circuit, the voltage on the second capacitor $C_2$, which is also applied to the voltage divider made up of eighth and seventh resistors $R_8$ and $R_7$, will increase until the base-emitter junction of a third transistor $T_3$ is biased with a voltage causing the transistor $T_3$ to conduct and a current to flow through the collector of the third transistor $T_3$, which current will flow part through second resistor $R_2$ and other part to a fourth transistor $T_4$ base, thereby also biasing the base-emitter junction of this fourth transistor $T_4$ causing the collector of this transistor to drain current which will be added to the current already flowing through the resistor $R_7$. This increases the third transistor $T_3$ bias. This chain reaction causes the third and fourth transistor $T_3$ and $T_4$ to suddenly saturate, thereby increasing the voltage in the collector of the third transistor $T_3$ and in the emitter of the fourth transistor $T_4$ to a value very near to the point 5 voltage, thus driving first and second transistors $T_1$ and $T_2$ to saturation.

The voltage in the point 5 wherein the trip occurs is defined by the relationship between the eighth and seventh resistors $R_8$ and $R_7$ and the base-emitter junction bias voltage of the third transistor $T_3$ which typically is 0.6 V. The connection of the second resistor $R_2$ to the fourth transistor $T_4$ base avoids that the leakage current through the third transistor $T_3$ collector causes an undesirable trigger of the timer. The voltage divider made up of the seventh and eight resistors $R_7$ and $R_8$ will also operate to discharge the second capacitor $D_2$ when the motor stops, and places the circuit in the initial condition for another starting.

The time elapsed from the motor powering up to TRIAC S conduction interruption is basically defined by the second capacitor $C_2$ and the third capacitor $C_3$ values. The third capacitor $C_3$ value which is responsible for limiting said current $I_T$ is computed so as to supply a circuit consumption current which is drained under permanent regimen by the second and third resistors $R_2 R_3$, and seventh and eighth resistors $R_7$ and $R_8$.

The use of capacitor $C_3$ as a current limiter replacing a resistor reduces the power consumption of the circuit to a greatly negligible minimum level.

Capacitor $C_2$ is selected to delay any increase in the voltage in the point 5 during the starting, by defining the time the starting device operates.

Resistor $R_6$ which is connected in series to capacitor $C_3$ works as a protecting device thereby limiting the current supplied to the circuit during eventual transient voltage supplied by the voltage source F.

Figure 2:
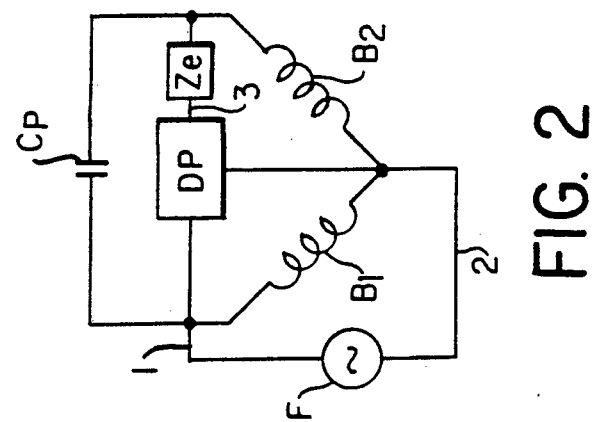
FIG. 2 shows, in a simplified way, the starting circuit connection as proposed in a motor configuration using an external impedance in the starting circuit and permanent capacitor.

FIG. 2 shows in a simplified way the electronic circuit connection for starting the single phase induction motor hereinabove described, in a motor configuration using an external impedance $Z_e$ and the permanent capacitor $C_p$. In this configuration, the external impedance $Z_e$, which can be a starting resistor or a starting capacitor, is inserted between a terminal 3 of the starting circuit and the connection point of the starting coil to the permanent capacitor $C_p$. After the starting of the motor, the external impedance $Z_e$, which is in series with TRIAC S, will be disconnected from the circuit, and only the permanent capacitor $C_p$ will stay connected to the starting coil $B_2$.

As hereinabove described, the circuit shown in FIG. 1 then starts the single phase induction motor, thereby dissipating a negligible amount of power and allowing it to be used in conjunction with a permanent capacitor or a permanent capacitor and a starting capacitor or individually by temporarily connecting it to a starting coil.

What is claimed is:

1. An electronic circuit for starting a single phase induction motor of the type having a cage type rotor and a stator with at least a main winding and a starting winding for operating on alternating current supplied from a source comprising,
    a permanent capacitor connected in series with the starting winding; and
    first and second circuit terminals for connecting the main winding in series with the alternating current source, said permanent capacitor and the starting winding being connected in parallel to said circuit terminals,
    a TRIAC having a first terminal connected to the first circuit terminal of the alternating current source, a second terminal connected to the starting winding and to the permanent capacitor, and a GATE terminal;
    a TRIAC trigger circuit formed by a first capacitor having one terminal connected to the second terminal of the TRIAC and another terminal connected to the GATE terminal of TRIAC through a first resistor;
    a bilateral switch connected between the GATE terminal and the first terminal of the TRIAC, said switch having control terminals; and
    a timer circuit connected to the control terminals of the bilateral switch and to the first and second circuit terminals of the alternating current source,
    said timer circuit defining the time elapsed from the motor powering up until the interruption of the TRIAC conduction caused by turning on the bilateral switch,
    the TRIAC trigger circuit repeatedly triggering the TRIAC to a turn on condition at the beginning of each current half-cycle while the bilateral switch remains cut off by the timer circuit.

2. An electronic circuit, according to claim 1, wherein the capacitance value of the first capacitor allows that the voltage variation rate over a timer period, between first and second terminals of the TRIAC causes a flow of a current to the GATE terminal of the TRIAC, sufficient to trigger the TRIAC.

3. An electronic circuit, according to claim 1, wherein the current stored in the first capacitor builds up and is discharged as a pulse when the TRIAC conducts, the first resistor limits the discharge current pulse intensity of the first capacitor through the GATE terminal of the TRIAC to a safe level in relation to the TRIAC characteristics.

4. An electronic circuit, according to claim 1, wherein the bilateral switch comprises
    a first and a second bipolar transistor,
    the emitter of the first transistor connected to the first terminal of TRIAC and the collector connected to the GATE terminal of the TRIAC,
    the collector of the second transistor connected to the first terminal of the TRIAC and the emitter connected to the GATE terminal of the TRIAC,
    the bases of said first and second transistors being connected to the timer circuit through a second and a third resistor.

5. An electronic circuit, according to claim 1, wherein the timer circuit comprises:
    a current limiter means connected between the second circuit terminal and the input of a rectifier circuit;
    a timing capacitor connected between said one circuit terminal and an output of said rectifier circuit;
    a voltage trigger circuit having an input connected to a point linking the rectifier circuit outlet and the first terminal of the timing capacitance;
    a reference terminal connected to said first circuit terminal and outlet terminals connected to said second and third resistor.

6. An electronic circuit, according to claim 5 wherein the current limiting circuit comprises:
    a third capacitor with a terminal being connected to said second circuit terminal,
    and the other terminal connected to the rectifier circuit input through a sixth resistor.

7. An electronic circuit, according to claim 5, wherein the rectifier circuit comprises a first rectifier diode whose anode is connected to the current limiting circuit and cathode connected to the first terminal of the timing capacitor and a second rectifier diode whose cathode is connected to the anode of the first rectifier diode and anode connected to the first terminal of the alternating current source.

8. An electronic circuit, according to claim 5, wherein the voltage trigger circuit comprises a third bi-polar transistor with the emitter thereof being connected to the first terminal of the timing capacitor, with the collector being connected to said second resistor; a resistor interconnecting the base and the emitter of said third transistor; a fourth bi-polar transistor with its base connected to the collector of said third transistor, the collector being connected to the base of said third transistor and the emitter being connected to said third resistor; a resistor interconnecting the collector of said fourth transistor and the alternating current source first terminal.

9. An electronic circuit, according to claim 6, wherein the current limitation is substantially produced by said third capacitor.

10. An electronic circuit, according to claim 6, wherein said sixth resistor limits the current during transient voltage conditions of the alternating current source.

11. An electronic circuit, according to claim 1, wherein an external impedance is connected between the second terminal of TRIAC and the motor starting coil terminal connected to the permanent capacitor.

12. An electronic circuit, according to claim 11, wherein the external impedance is a resistor or a starting capacitor.

* * * * *

UNITED STATES PATENT AND TRADEMARK OFFICE
CERTIFICATE OF CORRECTION

PATENT NO. : 5,051,681
DATED : September 24, 1991
INVENTOR(S) : Marcos G. Schwarz It is certified that error appears in the above-indentified patent and that said Letters Patent is hereby corrected as shown below:

On the title page of the patent, Section (73), please delete

"Empresa Brasileira de Compressores S/A Embarco" and substitute therefor

--Empresa Brasileira de Compressores S.A.- EMBRACO--.

Signed and Sealed this

Thirteenth Day of September, 1994

Attest:

BRUCE LEHMAN

*Attesting Officer*   *Commissioner of Patents and Trademarks*